FIG. I.

United States Patent Office 3,515,980
Patented June 2, 1970

3,515,980
TAP CHANGER WITH VOLTAGE AND CURRENT RESPONSIVE PROTECTIVE MEANS
Gilbert D. Throop, West Middlesex, Pa., assignor to Westinghouse Electric Corporation, Pittsburgh, Pa., a corporation of Pennsylvania
Filed July 5, 1968, Ser. No. 742,576
Int. Cl. G05f 1/20
U.S. Cl. 323—43.5                                      12 Claims

ABSTRACT OF THE DISCLOSURE

A tap changer which protects load transfer switches from excessive arcing upon opening of the switches. Solid state logic circuitry in cooperation with voltage and current transformers provide gating signals for semiconductor switches to by-pass an opening transfer switch.

BACKGROUND OF THE INVENTION

Field of the invention

The invention relates in general to tap changer apparatus for electrical inductive apparatus, such as transformers, and more particularly to tap changer apparatus for changing taps on an electrical winding under load, with reduced arcing.

Description of the prior art

When electrical current is interrupted by the contacts of a mechanical circuit interrupting device, such as a circuit breaker, contactor, or load tap changer, arcing occurs at the contacts of the circuit interrupter, which burns and pits the contacts and deleteriously affects their useful operating life. If the circuit interrupter is disposed in an insulating dielectric, an electrical arc may break down the dielectric into by-products which reduce its electrical insulating strength. Thus, protective circuits have been developed for alternating current systems wherein solid state switching means, such as two silicon controlled rectifiers connected in inverse parallel, are connected in shunt with the contacts of the circuit interrupting device, with one of the controlled rectifiers being gated when the contacts of the circuit interrupter start to open, which carries the load current. The gated controlled rectifier carries the load current until the first current zero, at which time it recovers its blocking ability. Thus, there is very little arcing when the mechanical contacts open, as the circuit is still complete through the gated controlled rectifier, and there is no arcing when the controlled rectifier interrupts the circuit at a current zero. For example, U.S. Pat. 3,260,894, issued July 12, 1966, which is assigned to the same assignee as the present application, discloses a protective circuit of this type.

Underload tap changer systems of the type having a no-load tap selector switch and two underload transfer switches, require periodic maintenance of the contacts of the load transfer switches. Since the required down time for maintenance and inspection is costly, in addition to the replacement cost of the contacts, the application of controllable semiconductor switches to protect these contacts is especially attractive. Applying the teachings of the hereinbefore mentioned United States patent to the two transfer switches of an underload tap changer system, would require four controllable power semiconductor switching devices. Since controllable power semiconductor switching devices capable of handling the load currents associated with power tap changer apparatus are relatively costly, it would be desirable to be able to protect the load transfer switches with fewer controllable semiconductor switching devices. Copending application Ser. No. 569,- 728, filed Aug. 7, 1966, now abandoned, which application is assigned to the same assignee as the present application, discloses protective apparatus for tap changers of the hereinbefore described type, which requires only two controllable power switching devices. Logic for gating the proper switching device must take into consideration which of the transfer switches is being opened, and the instantaneous direction of the alternating current through the switch being opened. The copending application obtains the former information mechanically, via auxiliary contacts which open prior to the impending opening of the current carrying contacts, to connect a gating transformer into the circuit, which provides the latter information electrically, via a gating pulse applied to one of the controllable switching devices, according to the polarity of the AC current. While this arrangement provides excellent results, it would be desirable, at least in some instances, to develop the switching logic electrically, without modification of the tap changer structurally, and without requiring auxiliary or additional contacts on the load transfer switches.

SUMMARY OF THE INVENTION

Briefly, the present invention is a new and improved tap changer system which includes an output terminal, first and second load transfer switches, a divided preventive auto transformer or reactor having first and second windings, and a tap selector switch having first and second movable contact arms. The first and second transfer switches each have one end connected to the output terminal, and their other ends connected to the first and second movable contact arms, respectively, of the tap selector switch, through the first and second windings, respectively, of the preventive reactor. The tape changer system also includes first and second controllable power semiconductor switching devices, which are connected in inverse parallel between the first and second load transfer switches, at their junctions with the first and second windings of the preventive reactor, and gating means for providing switching signals for the switching device. In one embodiment of the invention, first and second logic means provide gating signals for the first and second semiconductor switching devices, respectively, in response to voltage and current responsive means which provide signals for the first and second logic means in response to the voltage across, and the current through, the first and second load transfer switches. The first and second logic means and the voltage and current responsive means cooperate to gate the proper semiconductor switching device. In another embodiment of the invention, the first and second semiconductor switching devices are gated by voltage responsive means connected across each of the load transfer switches, in series with logic means responsive to current responsive means.

BRIEF DESCRIPTION OF THE DRAWING

Further advantages and uses of the invention will become more apparent when considered in view of the following detailed description and drawing, in which.

DESCRIPTION OF THE PREFERRED EMBODIMENT

Figure 1:
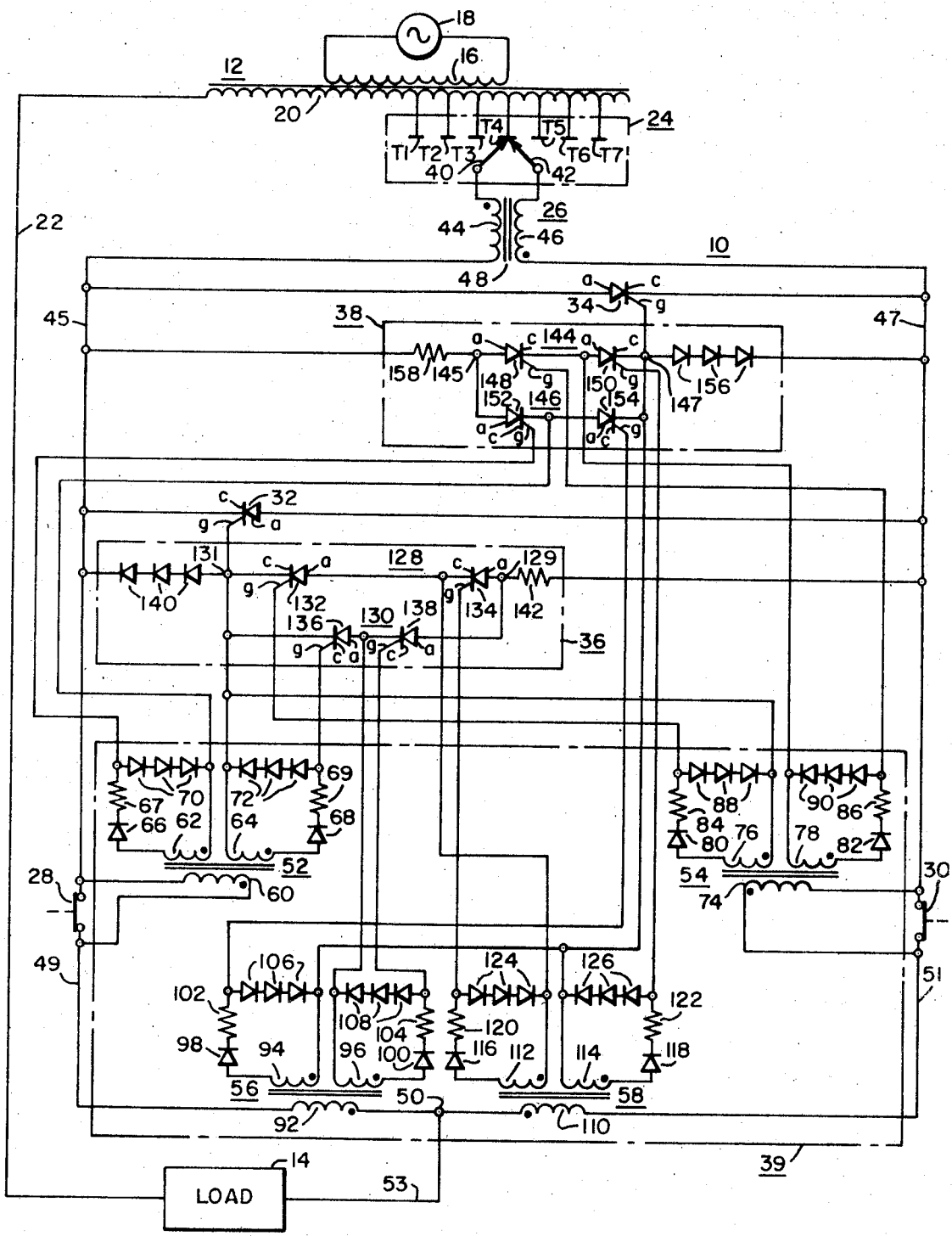
FIG. 1 is a schematic diagram of tap changer apparatus constructed according an embodiment of the invention.

Referring now to the drawings, and FIG. 1 in particular, there is illustrated a schematic diagram of tap changer apparatus 10, including arc protection apparatus, constructed and arranged according to the teachings of the invention. Tap changer 10 is shown connected between a single-phase transformer 12 and a load circuit 14, for purposes of example, but it will be understood that tap changer apparatus 10 may be used in single or polyphase power circuits, with transformers of the isolated winding type, as illustrated, or with transformers of the autotransformer type. Tap changer means 10, depending upon its application, may be manually operated, or automatically operated by suitable regulator means (not shown), which is responsive to a predetermined condition to be regulated, such as voltage, current or phase angle. For example, if the load circuit 14 is an electric arc furnace, tap changer apparatus 10 may be manually operated by the operator of the electric arc furnace. If the load circuit 14 is an electrical distribution system, tap changer apparatus 10 may be operated by voltage regulator means in order to maintain a predetermined voltage across the load circuit 14.

More specifically, transformer 12 includes a primary winding 16 connected to a source 18 of alternating potential, and a secondary winding 20 having a plurality of tap connections thereon. One end of secondary winding 20 is connected to one side of load circuit 14 via conductor 22, and the other connection to the load circuit 14 is accomplished through a tap or taps on the secondary winding 20, through tap changer apparatus 10 to output terminal 50, and to the load circuit 14 via conductor 53.

Tap changer apparatus 10 includes selector switch means 24, divided preventive reactor or autotransformer means 26, first and second load transfer switches 28 and 30, respectively, first and second controllable semiconductor switching means 32 and 34, respectively, and gating means for the semiconductor switching means which includes first and second logic means 36 and 38, respectively, and voltage and current responsive means 39.

Selector switch means 24 includes a plurality of stationary contacts connected to taps on secondary winding 20, with seven contacts being shown for purposes of example, given the reference numerals T1 through T7. Selector switch means 24 also includes first and second movable contact arms 40 and 42, respectively, which, in response to tap changer drive means (not shown), moves sequentially from contact to contact to effect tap changes on secondary winding 20, as required. Only one of the movable contact arms move at a time, in order to make a tap change without interrupting the load current. Selector switch means 24 is a no-load switch. Thus, it is mechanically interlocked through the tap changer drive means, which also operates the load transfer switches 28 and 30, to insure that when one of the movable contact arms is moved, its associated load transfer switch is open.

In order to accomplish a tap change on secondary winding 20, it is necessary to bridge two adjacent stationary contacts of selector switch means 24 with the first and second movable contact arms 40 and 42, sometime during the tap change. Many tap changer systems are designed to allow continuous operation in this bridging position, as it provides a voltage substantially half-way between the voltages of the respective tap positions. When the selector switch means 24 is in the bridging position, however, it effectively short circuits the winding portion connected between the two tap positions, which would cause excessive circulating current. Therefore, it is necessary to provide means for limiting this circulating current, without restricting the flow of load current. As shown in the figure, a divided preventive autotransformer or reactor 26 may be used, which has first and second winding portions or sections 44 and 46 each having a first end connected to the movable contact arms 40 and 42, respectively. Windings 44 and 46 are wound in inductive relation with a magnetic core 48, such that the load current will substantially cancel the inductive effect of the windings, but will set up a large reactance and impedance to the flow of circulating currents. In other words, the instantaneous polarities of adjacent ends of winding sections 44 and 46 will be opposite, as indicated by dots in FIG. 1 due to load current flow. Circulating currents, however, would provide similar instantaneous polarities at adjacent ends of the winding sections, and the windings would set up an impedance to their flow.

In order to isolate the particular movable contact arm of selector switch means 24 prior to its changing tap positions, and prevent arcing of the selector switch contacts, transfer switch 28 is connected to the second end of winding 44 of preventive reactor 26, and transfer switch 30 is connected to the second end of winding 46 of preventive reactor 26. The other side of the transfer switches 28 and 30, as will be hereinafter explained, are connected through the primary windings of current transformers to the output terminal 50, which in turn is connected to the load circuit 14. Thus, there are two separate parallel circuits between secondary winding 20 and the load circuit 14, with the first branch including movable contact arm 40 of selector switch means 24, winding section 44 of preventive reactor means 26, and transfer switch 28. The second branch includes movable contact arm 42, winding section 46, and transfer switch 30. Before one of the movable contact arms, 40 or 42, is moved to a different tap position, the parallel circuit it is associated with is opened by its associated transfer switch. Therefore, transfer switches 28 and 30 must interrupt the load current, and each usually includes parallel connected main contacts and arcing contacts. The main contacts open prior to the opening of the arcing contacts, and close in reverse sequence, to prevent the main contacts from arcing. The high temperature of the load current arc and the relatively high switching frequency demanded of most load tap changers, however, cause even the best arc resisting materials to erode, such as alloys formed of copper and tungsten, which require their replacement on a periodic inspection and maintenance schedule. Since the maintenance and replacement of transfer switch contacts, and the downtime required to inspect and maintain the apparatus involves a substantial expense, it would be desirable to be able to operate the transfer switches 28 and 30 in a substantially arcless manner.

This objective is accomplished by the teachings of this invention, by using solid state semiconductor switching means 32 and 34 to carry the load current, as soon as the contacts of a transfer switch start to open, until the first current zero crossing point, at which point the circuit is effectively interrupted without arcing. Solid state switching means 32 and 34 may be thyristors, such as silicon semiconductor controlled rectifiers, which have the characteristic of conducting electrical current in a predetermined direction in response to an appropriate signal applied to its gate or control electrode, when its anode electrode is positive with respect to its cathode electrode. Once conduction is initiated, the control electrode loses control and the current flow will continue until the current magnitude drops below its holding value. Thus, in alternating current systems, current will flow through a semiconductor controlled rectifier only until polarity reversal, and the control electrode will then again regain control. This characteristic of controlled rectifiers is used to provide a substantially arcless interruption of load current, by paralleling or shunting both of the transfer switches, and by gating the appropriate controlled rectifier when the contacts of a transfer switch start to open. These contacts may be the arcing contacts; or, the arcing contacts may be eliminated and the main contacts may be used to initiate the switching signals. Thus, when the main contacts of a transfer switch start to open they will be paralleled by a conductive controlled rectifier, which will continue to conduct current until the first current zero point. At the first current zero, the controlled rectifier will cease to conduct, and one of the parallel circuits through the tap changer apparatus 10 will be completely isolated, which allows its associated movable contact arm of selector switch means 24 to be moved to a new tap position without arcing.

Semiconductor switching means 32 and 34 each have an anode, cathode and gate or control electrodes a, c and g, respectively, and they are connected to provide two separate circuits between the ends of winding sections 44 and 46 of preventive reactor means 26, which windings are connected in common at output terminal 50 through transfer switches 28 and 30. Semiconductor switching means 32 and 34 are poled in opposite directions, i.e., connected in inverse parallel, enabling one of the transfer switches to always be capable of carrying the load current, regardless of which transfer switch is being opened, and regardless of the direction of the instantaneous current flowing through the opening transfer switch. Thus, the cathode electrode c of semiconductor switching means 32 is connected to conductor 45, which conductor joins transfer switch 28 with winding 44, and its anode electrode a is connected to conductor 47, which conductor joins transfer switch 30 with winding 26. The second semiconductor switching means 34 has its anode electrode a connected to conductor 45, and its cathode electrode c connected to conductor 47. The gate electrodes g of semiconductor switching means 32 and 34 are connected to logic means 36 and 38, respectively.

Logic means 36 and 38 coordinates the signals from the voltage and current responsive means 39, to gate the appropriate semiconductor switching means as the contacts of a specific transfer switch start to open. Further, the logic means must coordinate the selection of the semiconductor switching means with the instantaneous direction of the load current through the opening transfer switch. According to the teachings of this invention, the voltage and current signals, and the necessary logical coordination thereof required to gate the proper semiconductor switching means, regardless of which transfer switch starts to open and regardless of the direction of the load current, is accomplished electrically. Therefore, mechanical modifications to the tap changer are not required, which enables the tap changer apparatus to be manufactured without mechanical change. The electrical protective apparatus may be easily and simply installed, even in the field.

In general, the logic means senses the voltage across the transfer switches, and its polarity, and the current through the transfer switches, and its polarity. If there is current flowing through a transfer switch and no voltage drop across it, the switch is closed, and the logic means should not initiate a switching signal. If there is voltage across a transfer switch, and no current flowing through it, the switch is open, and again the logic means should not initiate a switching signal. If a transfer switch is closed and conducting current, and it starts to open, as soon as the contacts start to part, i.e. the arcing contacts if used, or the main contacts in the event that the arcing contacts are not used, there will be current flow through the minute arc that starts to develop, and since the arc will have a finite resistance, there will be a voltage drop across the transfer switch. This combination of a voltage drop across a specific transfer switch, and current through this switch, is used by the logic means to gate the semiconductor switching means which will by-pass the opening transfer switch.

The proper combination of current and voltage responsive signals must, therefore, cause the logic means of the proper semiconductor switching means to initiate a switching signal. Each of the logic means 36 and 38 has two "and" gates. A current signal and a voltage signal from transfer switch 28, when the instantaneous load current is flowing from terminal 50 towards the taps on winding 20, will produce an output from one "and" gate of the first logic means 36, and current and voltage signals from transfer switch 30, when the instantaneous load current is flowing from the tap connections on winding 20 to output terminal 50, will produce an output from the other "and" gate of the first logic means 36. The current signal and the voltage signal from transfer switch 28, when the instantaneous load current is flowing from the taps on winding 20 towards output terminal 50, will produce an output from one of the "and" gates of the second logic means 38, and current and voltage signals from transfer switch 30, when the instantaneous load current is flowing from output terminal 50 towards the taps on winding 20, will produce an output from the other "and" gate of the second logic means 38. An output from an "and" gate from logic means 36 or from logic means 38, will provide the necessary gating signal to switch its associated semiconductor switching means 32 or 34, respectively.

More specifically, the voltage and current responsive means 39 includes first and second potential transformers 52 and 54, respectively, and first and second current transformers 56 and 58, respectively. The first potential transformer 52 includes a primary winding 60 connected across the contacts of transfer switch 28, a secondary winding 62 connected to logic means 38, and a secondary winding 64 connected to logic means 36. When the instantaneous direction of the current through winding 60 is into the dotted end of winding 60, the polarities of windings 62 and 64 will be as indicated by the dots in FIG. 1. In order to prevent reverse voltages from being applied to the gate-cathode junction of switching means 32 and 34, diodes 66 and 68 may be connected in series with secondary windings 62 and 64, respectively. Diode 66 is poled to conduct current from the undotted end of winding 62 to logic means 38, through a current limiting resistor 67, and diode 68 is poled to conduct current from the dotted end of winding 64, through a current limiting resistor 69, to logic means 36. In order to limit the magnitude of the gating signals provided by secondary windings 62 and 64, regardless of the magnitude of the voltage across the contacts of load transfer switch 28, a plurality of diodes 70 may be serially connected across winding 62, poled to limit the output signal from winding 62 to the magnitude of the threshold values of the diodes. In like manner, a plurality of diodes 72 may be serially connected across the output of winding 64, poled to limit the magnitude of the output signal of winding 64 to the sum of the threshold values of the diodes.

Potential transformer 54 has a primary winding 74 connected across the contacts of load transfer switch 30, a secondary winding 76 connected to logic means 36, and a secondary winding 78 connected to logic means 38. When the current flows into the dotted end of primary winding 74, the polarities of the secondary windings 76 and 78 will be as indicated by the dots. A diode 80 is connetced to winding 76, poled to conduct current from its undotted end through a current limiting resistor 84, to logic means 36. A plurality of serially connected diodes 88 may be connected across secondary winding 76, poled to limit the magnitude of its output signal to the sum of the threshold values of the diodes, regardless of the magnitude of the voltage across transfer switch 30. A diode 82 is connected to winding 78, poled to conduct current from its dotted end, through current limiting resistor 86, to logic means 38. A plurality of serially connected diodes 90 may be connected across the output of winding 78 to limit the magnitude of its output signal to the sum of the threshold values of the diodes.

Current transformer 56 has a primary winding 92 connected serially with the parallel branch which includes movable contact arm 40, reactor winding 44, and load transfer switch 28. Thus, one end of primary winding 92 is connected to load transfer switch 28 via conductor 49, and its other end is connected to output terminal 50. Current transformer 56 has secondary windings 94 and 96 connected to logic means 38 and 36, respectively, with winding 94 having a diode 98 connected thereto, which is poled to conduct current from its undotted end, through current limiting resistor 102, to logic means 38. A plurality of serially connected diodes 106 are connected across the output of winding 94, poled to limit the magnitude of its output signal to the sum of the threshold voltages of the diode, regardless of the magnitude of the current flowing through transfer switch 28. Winding 96 has a diode 100 connected to its dotted end, poled to conduct current from its dotted end, through current limiting resistor 104, to logic means 36. Serially connected diodes 108 are connected across the output of winding 96, poled to limit the magnitude of its output signal.

Current transformer 58 has a primary winding 110, which is connected in the parallel branch which includes movable contact arm 42, reactor winding 46, and load transfer switch 30. Primary winding 110 has one end connected to load transfer switch 30 via conductor 51, and its other end is connected to output terminal 50. Current transformer 58 has secondary windings 112 and 114 connected to logic means 36 and 38, respectively, with secondary winding 112 having a diode 116 poled to conduct current from its undotted end, through current limiting resistor 120, to gating means 36. A plurality of diodes 124 are serially connected across winding 112, to limit the magnitude of its output signal. Secondary winding 114 has a diode 118 poled to conduct current from its dotted end, through current limiting resistor 122, to logic means 38. A plurality of serially connected diodes 126 are connected across its output, poled to limit the magnitude of its output signal. Diodes 98, 100, 116 and 118, associated with the current transformers 56 and 58, in addition to providing the function of preventing reverse voltage from being applied to the gate-cathode junctions of the controlled rectifiers, also provide the function of preventing one output winding from "loading" the other, on each current transformer.

The first logic means 36, which provides gating or switching signals for semiconductor switching means 32, includes a circuit connected between conductors 45 and 47 which includes a current limiting resistor 142, a parallel circuit having first and second branches 128 and 130, connected between terminals 129 and 131, and a plurality of serially connected diodes shown generally at 140. Branch 128 of the parallel circuit includes two serially connected semiconductor switching devices 132 and 134, poled to conduct current from terminal 129 to terminal 131, such as silicon controlled rectifiers, each having anode, cathode and gate electrodes, a, c and g, respectively, and branch 130 has two serially connected semiconductor switching devices 136 and 138, also poled to conduct current from terminal 129 to terminal 131, which may also be silicon controlled rectifiers. Resistor 142 has one end connected to conductor 47, and its other end connected to terminal 129 of the parallel circuit. Terminal 131 of the parallel circuit is connected to one side of the serially connected diodes 140, and the other side of the serially connected diodes 140 is connected to conductor 45. The serially connected diodes are poled to conduct current from terminal 131 to conductor 45. The gate-cathode junction of semiconductor switching means 32 is connected across the serially connected diodes 140, with the gate electrode g of switching means 32 being connected to terminal 131, and its cathode electrode c being connected to conductor 45. Thus, the sum of the threshold voltages of the serially connected diodes 140 determines the voltage applied to semiconductor switching means 32, when logic means 36 becomes conductive. Logic means 36 will become conductive, applying a positive gate current to the gate electrode g of switching means 32, when controlled rectifiers 132 and 134 are conductive simultaneously, and also when controlled rectifiers 136 and 138 are conductive simultaneously. Thus, branch 128 is an "and" gate, with its controlled rectifier 132 being connected to secondary winding 76 of potential transformer 54, which is associated with transfer switch 30, and with its controlled rectifier 134 being connected to secondary winding 112 of current transformer 58 which is also associated with transfer switch 30. Branch 130 is also an "and" gate, with its controlled rectifier 136 being connected to winding 64 of potential transformer 52, which is associated with transfer switch 28, and with its controlled rectifier 130 being connected to winding 96 of current transformer 56, which is also associated with transfer switch 28. Thus, logic means 36 will provide switching signals to switching means 32 when transfer switch 28 starts to open and current is flowing into the dotted end of the primary windings 60 and 92 of potential transformer 52 and current transformer 56, respectively; and, when transfer switch 30 starts to open and current is flowing into the undotted ends of windings 74 and 110 of potential transformer 54 and current transformer 58, respectively.

In like manner, the second logic means 38, which provides switching signals for semiconductor switching means 34, includes a circuit connected between conductors 45 and 47, which includes a current limiting resistor 158, a parallel circuit having branches 144 and 146 connected between terminals 145 and 147, and a plurality of serially connected diodes shown generally at 156. Branch 144 has two serially connected controlled rectifiers 148 and 150, poled to conduct current from terminal 145 to terminal 147, and branch 146 has two controlled rectifiers 152 and 154, also poled to conduct current from terminal 145 to terminal 147. Resistor 158 has one end connected to conductor 47, and its other end connected to terminal 145 of the parallel circuit. Terminal 147 of the parallel circuit is connected to one end of the serially connected diodes 156, and the other end of the serially connected diodes 156 is connected to conductor 47. The serially connected diodes 156 are poled to conduct current from terminal 147 to conductor 47. The gate-cathode junction of semiconductor switching means 34 is connected across the serially connected diodes 156, with the gate electrode g of switching means 34 being connected to terminal 147, and with its cathode electrode c being connected to conductor 47. Thus, the sum of the threshold voltages of the serially connected diodes 156 determines the maximum voltage which will be applied to semiconductor switching means 34, when logic means 38 becomes conductive. Logic means 38 will become conductive, applying a positive gating current to the gate electrode g of switching means 34, when controlled rectifiers 148 and 150 are conductive simultaneously; and, also when controlled rectifiers 152 and 154 are conductive simultaneously. Thus branch 144 is an "and" gate, with its controlled rectifier 148 being connected to the secondary winding 78 of potential transformer 54, which is associated with transfer switch 30, and with its controlled rectifier 150 being connected to secondary winding 114 of current transformer 58, which is also associated with transfer switch 30. Branch 146 of the parallel circuit is also an "and" gate, with its controlled rectifier 146 being connected to winding 62 of potential transformer 52, which is associated with transfer switch 28, and with its controlled rectifier 154 being connected to secondary winding 94 of current transformer 56, which is also associated with transfer switch 28. Thus, logic means 38 will provide switching signals to switching means 34 when transfer switch 28 starts to open, and current is flowing into the undotted end of primary windings 60 and 92 of potential transformer 52 and current transformer 56, respectively, and also when transfer switch 30 starts to open and current is flowing into the dotted ends of windings 74 and 110 of potential transformer 54 and current transformer 58, respectively.

In the operation of tap changer means 10 shown in FIG. 1, assume that a tap change has been signalled, either manually by an operator, or automatically by suitable regulator means, which directs the tap changer 10 to move from tap T4 to tap T5. Transfer switch 30 will start to open. If it starts to open when the current flow is into the dotted ends of windings 74 and 110 of potential transformer 54 and current transformer 58, respectively, controlled rectifiers 148 and 150 of logic means 38 will be switched to their conductive states, gating switching means 34. The current through winding 46 of preventive reactor 26 will thus be carried through transfer switch 28 and controlled rectifier 34, and transfer switch 30 will continue to open without further arcing. The current through switching means 34 will cease at the first current zero crossing, and there will be no current flow through movable contact arm 42 of selector switch 24, allowing it to move to tap T5. If transfer switch 30 starts to open when the current flows into the undotted ends of windings 74 and 110, controlled rectifiers 132 and 134 of logic means 36 will be switched to their conductive states, gating controlled rectifier 32. The current through winding 46 will then be carried through controlled rectifier 32 and transfer switch 28, and transfer switch 30 can continue to open without further arcing. The current through switching means 32 will cease at the first current zero crossing, and selector switch 24 may be moved to tap T5 without arcing.

Transfer switch 30 may be then be closed, and transfer switch 28 will start to open. When transfer switch 28 starts to open, if the current flow is into the dotted ends of windings 60 and 92 of potential transformer 52 and current transformer 56, respectively, controlled rectifiers 136 and 138 of logic means 36 will be switched to their conductive states, gating switching means 32; and, if the current flow is into the undotted ends of windings 60 and 92, controlled rectifiers 152 and 154 of logic means 38 will be switched to their conductive states, gating switching means 34. The gated switching means carries the current to the first current zero point. The movable contact arm 40 may then be moved to tap T5 without arcing. Transfer switch 28 will then close to complete the tap change.

Figure 2:
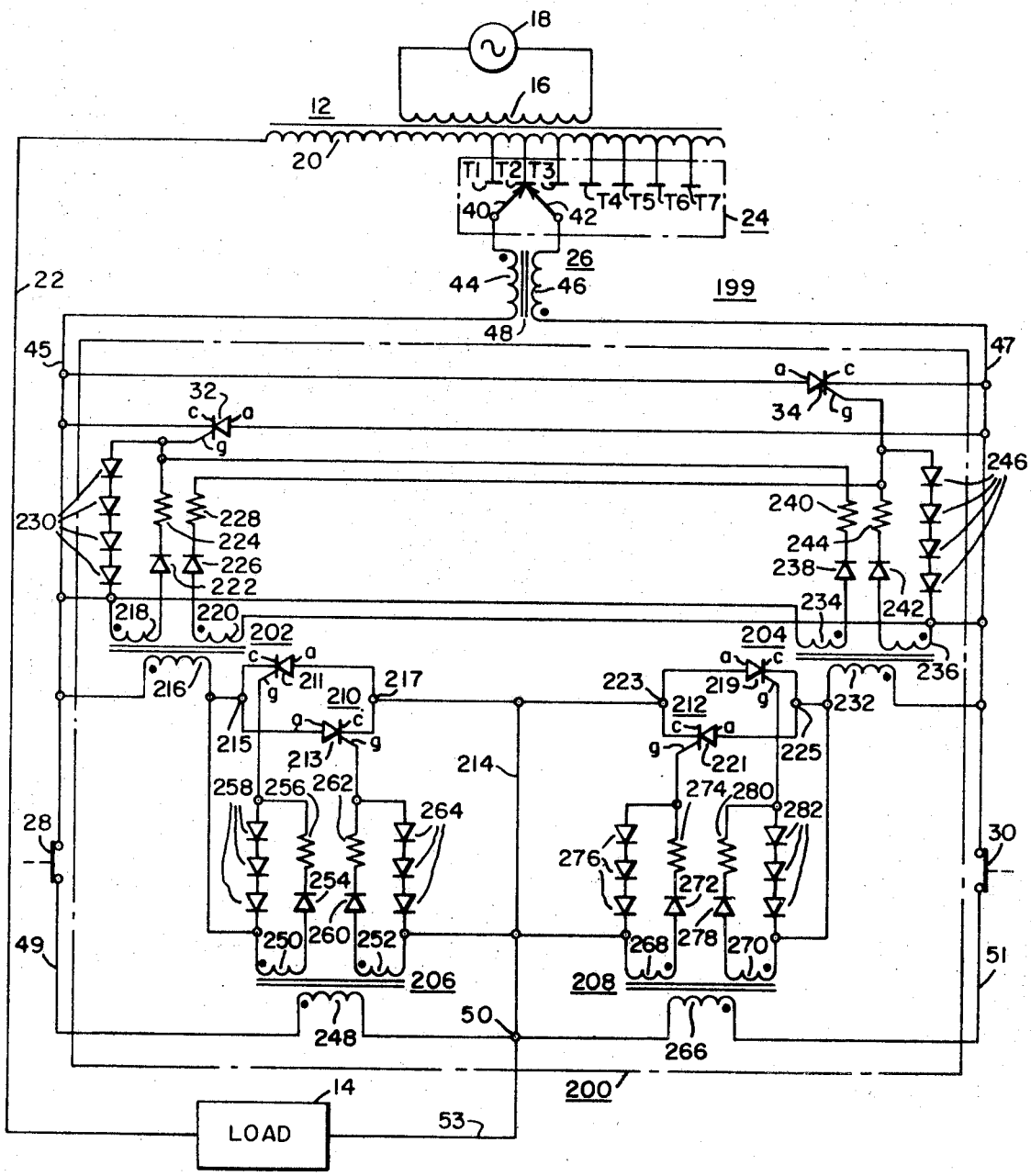
FIG. 2 is a schematic diagram of tap changer apparatus constructed according to another embodiment of the invention.

In the embodiment of the invention shown in FIG. 1, the potential transformers 52 and 54 are energized for the period of time their associated transfer switches 28 and 30, respectively are open and their associated tap switch selector arm is on a tap position. FIG. 2 is a schematic diagram of tap changer apparatus 199, protected by protective means 200, which is similar to the protective means shown in FIG. 1 in that it is responsive to the voltage across, and the current through, the transfer switches 28 and 30, but which is different in that the potential transformers are only energized for a short period of time, during the opening of their associated transfer switches. Like reference numerals in FIGS. 1 and 2 refer to like components.

In general, instead of coordinating the signals from the current transformers and potential transformers in logic means, which then provides the switching signals, as disclosed relative to the embodiment of the invention shown in FIG. 1, the embodiment of the invention shown in FIG. 2 connects the potential transformers across the load transfer switches through logic means which comprises bilateral AC semiconductor switching means. The logic means is provided with switching signals from current transformers, when current is flowing through its associated transfer switch. When current is flowing through a closed load transfer switch, the signals from the current transformers will not switch the bilateral AC switching means to its conductive state, as there will be little voltage drop across the closed switch. When a transfer switch starts to open, forward voltage will be applied to one of the switching devices of the bilateral AC switching means associated with the opening transfer switch, and the gating signal from one of the current transformers will switch it to its conductive state, allowing current flow through the primary winding of the potential transformer connected to the gated bilateral AC switching means. The energized potential transformer will provide a signal to one of the controllable semiconductor switching means connected to by-pass the opening load transfer switch, with the switching means being selected according to the direction of current flow through the primary winding of the potential transformer.

Specifically, protective apparatus 200 includes first and second controllable semiconductor switching devices 32 and 34, as hereinbefore described relative to the embodiment of the invention shown in FIG. 1, first and second potential transformers 202 and 204, first and second current transformers 206 and 208, and first and second logic means 210 and 212. Logic means 210 may include first and second semiconductor controlled rectifiers 211 and 213, connected in inverse parallel between terminals 215 and 217, and logic menas 212 may include first and second semiconductor controlled rectifiers 219 and 221, which are connected in inverse parallel between terminal 223 and 225. The first potential transformer 202 includes a primary winding 216 and secondary windings 218 and 220. The primary winding 216 of potential transformer 202 is connected across load transfer switch 28, through the bilateral AC switching or logic means 210, by connecting one end of primary winding 216 to conductor 45, and its other end to terminal 215 of logic means 210. The remaining terminal 217 of logic means 210 is connected to terminal 50 via conductor 214. Thus, the primary winding 216 of potential transformer 202 will only be energized when either controlled rectifier 211 or controlled rectifier 213 is switched to its conductive state. The relative instantaneous polarities of the primary and secondary windings of potential transformer 202, are as indicated by the dots in FIG. 2.

Secondary winding 218 of potential transformer 202 is connected to provide a switching signal for semiconductor switching device 32, with its undotted end being connected through diode 222 and current limiting resistor 224 to the gate electrode $g$ of switching device 32, and its other end is connected to the cathode electrode $c$ of switching device 32. In order to limit the magnitude of the signal applied to the gate-cathode junction of switching device 32, regardless of the magnitude of the current flowing through the primary winding 216, a plurality of diodes 230 may be serially connected across the output of winding 218, poled to limit the maximum signal to the sum of the threshold values of the diodes 230.

Secondary windings 220 of potential transformer 202 is connected to provide a switching signal for switching device 34, with its dotted end being connected to the gate electrode $g$ of switching device 34, via diode 226 and current limiting resistor 228, and its other end is connected to the cathode electrode $c$ of switching device 34. Thus, when current is allowed to flow into the dotted end of primary winding 216, a switching signal will be provided by secondary winding 220 to the gate-cathode junction of switching device 34, and when the current flow is into its undotted end, a switching signal will be provided by secondary winding 218 to the gate-cathode junction of switching device 32.

Potential transformer 204 includes a primary winding 232 and secondary windings 234 and 236. Primary winding 232 is connected across load transfer switch 30, via the logic or bilateral AC switching means 212, with one end of primary winding 232 being connected to conductor 47, and the other end of winding 232 being connected to terminal 225 of logic means 212. Terminal 223 of logic means 212 is connected to terminal 50 via conductor 214. The relative instantaneous polarities of the primary and secondary windings of potential transformer 204, are as indicated by the dots in FIG. 2.

Secondary winding 234 of potential transformer 204 is connected to provide a switching signal for semiconductor switching device 32, with the dotted end of winding 234 being connected to the gate electrode $g$ of switching device 32, via diode 238 and current limiting resistor 240, and the other end of winding 234 is connected to the cathode electrode c of switching device 32.

Secondary winding 236 of potential transformer 204 is connected to provide a switching signal for semiconductor device 34, with its undotted end being connected to the gate electrode g of switching device 34, via diode 242 and resistor 244, and its dotted end is connected to the cathode electrode c of switching device 34. The output signal of winding 236 may be limited to a predetermined maximum by serially connecting a plurality of diodes, indicated generally at 246, across the winding, with the diodes being poled to limit the output signal of winding 236 to the maximum of the threshold values of the diodes. It will be noted that the diodes 230, hereinbefore described relative to potential transformer 202, in addition to limiting the magnitude of the output signal from winding 218 also limits the magnitude of the output signal from winding 234, and that the serially connected diodes 246, in addition to limiting the maximum output signal from winding 236, also limit the maximum output signal from secondary winding 220 of potential transformer 202.

The first current transformer 206 is connected to sense the current flowing through load transfer switch 28, with current transformer 206 having a primary winding 248 and secondary windings 250 and 252. Current transformer 206 may have a separate primary winding, or it may be a current transformer of the through type in which the primary winding is the bus which is to have its current sensed. Primary winding 248 of current transformer 206 is connected serially between conductor 49 and terminal 50, and its secondary windings 250 and 252 are connected to logic means 210. The relative instantaneous polarities of the primary and secondary windings of current transformer 206 are as indicated by the dots. Secondary winding 250 is connected to provide a switching signal for switching device 211 of logic means 210, with its undotted end being connected to the gate electrode g of device 211 via diode 254 and current limiting resistor 256. The other end of winding 250 is connected to the cathode of electrode c of switching device 211. The maximum output signal of winding 250 may be limited by connecting a plurality of diodes 258 in series across the output of the winding, with the diodes being poled to limit the maximum positive signal applied to the gate-cathode junction of device 211. Secondary winding 252 of current transformer 206 is connected to provide switching signals for switching device 213 of logic means 210, with its dotted end being connected to the gate electrode g of switching device 213, via diode 260 and current limiting resistor 262. The other end of winding 252 is connected to the cathode electrode c of switching device 213. A plurality of serially connected diodes 264 may be connected across the output of winding 252, to limit its maximum signal.

The second current transformer 208 includes a primary winding 266 and secondary windings 268 and 270, having the relative instantaneous polarities indicated by the dots. The primary winding 266 is connected serially between terminal 50 and conductor 51, and thus senses the magnitude of the current flowing in load transfer switch 30. Secondary winding 268 of current transformer 208 is connected to provide switching signals for switching device 221 of logic means 212, with its dotted end being connected to the gate electrode g of switching device 221, via diode 272 and current limiting resistor 274, and its remaining end is connected to the cathode electrode c of switching device 221. A plurality of serially connected diodes 276 may be connected across the output of winding 268, in order to limit the maximum signal applied to switching device 221. Secondary winding 270 of current transformer 208 is connected to provide switching signals for switching device 219 of logic means 212, with its undotted end being connected to the gate electrode g, of switching device 219, via diode 278 and current limiting resistor 280, and its remaining end is connected to the cathode electrode c of switching device 219. A plurality of serially connected diodes 282 may be connected across the output of winding 270, in order to limit its maximum magnitude.

Logic means 210 and 212 each perform the logical "and" function, and in addition determines the direction of the instantaneous current through the opening transfer switch. For example, before a switching device in one of the logic means is rendered conductive, there must be current through its associated transfer switch, and there must be forward voltage across the device. The particular device selected in the logic means depends upon the direction of the instantaneous current flow through the opening switch.

With the arrangement shown in FIG. 2, when current is flowing through the load transfer switches 28 and 30, switching signals will be provided for logic means 210 and 212 by current transformers 206 and 208, respectively. However, with the load transfer switches 28 and 30 closed, there will be insufficient voltage drop across the logic means to switch a switching device in the logic means to its conductive condition. When one of the load transfer switches starts to open, however, sufficient forward voltage will be developed across one of the switching devices of the associated logic means, and that device will be switched to its conductive condition by a signal from the associated current transformer. If transfer switch 28 starts to open, and the direction of the instantaneous current flow is from selector switch 40 toward terminal 50, switching device 213 of logic means 210 will have both a switching signal and forward voltage, switching it to its conductive state, which allows current to flow into the dotted end of primary winding 216 of potential transformer 202. Secondary winding 220 of potential transformer 202 will apply a switching signal to semiconductor switching device 34, which switches device 34 to its conductive state and establishes a parallel circuit around the opening load transfer switch 28. Load transfer switch 28 may then continue to open without further arcing. The current will continue to flow through switching device 34 until the first current zero, at which point the circuit will be interrupted in an arcless manner. Thus, the selector switch 40 may be moved to another tap position without arcing. If the current was flowing in the opposite direction, from terminal 50 toward selector switch arm 40, when the load transfer switch 28 starts to open switching device 211 of logic means 210 will have forward voltage, and a switching signal from current transformer 206. Switching device 211 will switch to its conductive state, which energizes potential transformer 202 and applies a switching signal to semiconductor switching device 32. Switching device 32 will be switched to its conductive state, establishing a parallel circuit around the opening transfer switch 28. Transfer switch 28 may then continue to open without further arcing. The current will flow through switching device 32 until the first current zero, at which point the circuit will be interrupted, without arcing. The tap switch selector arm 40 may then be moved to another tap position without arcing.

If the direction of the instantaneous current flow is from tap switch selector arm 42 towards terminal 50, and transfer switch 30 starts to open, secondary winding 268 of current transformer 208 will switch switching device 221 of logic means 212 to its conductive state, energizing the primary winding 232 of potential transformer 204 and applying a switching signal from secondary winding 234 to switching device 32. When switching device 32 is rendered conductive, it sets up a parallel path about the opening load transfer switch 30, which allows load transfer switch 30 to continue to open without arcing. Upon the first current zero, switching device 32 will become nonconductive, interrupting the circuit without arcing. Tap switch selector arm 42 may then be moved to another tap position without arcing. If the direction of the current was in the opposite direction, from terminal 50 toward tap switch selector arm 42 when the load transfer switch 30 starts to open, secondary winding 270 of current transformer 208 will switch switching device 219 of logic means 212 to its conductive state, energizing primary winding 232 of potential transformer 204 and applying a switching signal from its secondary winding 236 to the semiconductor switching device 34. When semiconductor switching device 34 is switched to its conductive state, it sets up a parallel path about the opening load transfer switch 30, allowing the switch 30 to continue to open without arcing. At the first current zero, switching device 34 will switch to its non-conductive state, and tap switch selector arm 42 may be moved to the next tap position without arcing.

In the embodiment of the invention shown in FIG. 2, it will be recognized that the potential transformers 202 and 204 are energized only for the short period of time during which its associated load transfer switch starts to open. Therefore, the potential transformers in this embodiment of the invention may have a lower volt-second capability than the potential transformers required in the embodiment of the invention shown in FIG. 1.

In summary, there has been disclosed new and improved tap changer apparatus which operates in a substantially arcless manner. The only arcing at the contacts of an opening transfer switch is at the instant the contacts start to open. As soon as the arc develops sufficient voltage, a parallel path will be established around the opening transfer switch, which extinguishes the arc. The switching means of the parallel path will continue to carry the current until the first current zero, where the circuit will be interrupted in an arcless manner. Further, the protective apparatus for reducing the arcing is completely static, with the logic for selecting the proper switching means being electrical. Thus, the tap changer apparatus may be manufactured without regard to whether or not it will utilize the arc reducing protective apparatus. The protective apparatus may be added to the tap changer merely by connecting the primary windings of the potential transformers across the load transfer switches, by connecting the primary windings of the current transformers between the load transfer switches and output terminal 50, and by connecting the two power controllable semiconductor switching means between conductors 45 and 47. In one embodiment of the invention the signals from the current and voltage transformers are applied to logic means, and the logic means provides a switching signal for the proper power switching means, in response to current through, and voltage across, a load transfer switch. In another embodiment, logic means is connected across each transfer switch, in series with the primary winding of the potential transformer which is connected across the transfer switch. The logic means in this instance is also switched when there is current through, and voltage across a load transfer switch, but it senses the voltage directly, instead of from a potential transformer, with the potential transformers being used to provide the gating signals.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. Tap changer apparatus comprising:
   an output terminal,
   first and second load transfer switches,
   reactor means having first and second windings,
   tap changer means having a plurality of stationary contacts adapted for connection to an electrical winding, and first and second movable contact arms for selectively engaging said stationary contacts,
   said first and second load transfer switches being connected from said output terminal through said first and second reactor windings, respectively, to said first and second movable contact arms, respectively,
   first and second controllable solid state switching means connected in inverse parallel between said first and second load transfer switches, at their junctions with said first and second reactor windings, respectively, and
   means for providing switching signals for said first and second solid state switching means when one of said load transfer switches starts to open, with the solid state switching means selected to become conductive providing a circuit in parallel with the opening load transfer switch, until the first current zero, to effect a substantially arcless opening of the load transfer switch, and subsequent isolation of the associated movable contact arm, said means including first and second current transformers disposed to provide signals in response to current flow through said first and second load transfer switches, respectively, and the direction thereof, first and second potential transformers disposed to provide signals in response to voltage across said first and second load transfer switches, respectively, and the polarity thereof, and logic means for coordinating the signals from said voltage and current transformers to select the proper solid state switching means to be switched to its conductive condition.

2. The tap changer apparatus of claim 1 wherein the logic means includes first and second "and" gates which provide switching signals for the first and second solid state switching means, respectively, when said "and" gates are rendered conductive by predetermined combinations of signals from the voltage and current transformers.

3. The tap changer apparatus of claim 2 wherein the first and second potential transformers and the first and second current transformers each have first and second windings connected to the first and second "and" gates, respectively.

4. The tap changer apparatus of claim 3 wherein the first "and" gate provides a switching signal for its associated first solid state switching means when it receives predetermined signals simultaneously from the first potential transformer and the first current transformer, and when it receives predetermined signals simultaneously from the second potential transformer and the second current transformer, and wherein the second "and" gate provides a switching signal for its associated second solid state switching means when it receives predetermined signals simultaneously from the first potential transformer and the first current transformer, and also when it receives predetermined signals simultaneously from the second potential transformer and the second current transformer.

5. The tap changer apparatus of claim 4 wherein each of the "and" gates includes first, second, third and fourth switching devices, connected to render the "and" gate conductive when said first and second switching devices are conductive, and also when said third and fourth switching devices are conductive, said first and second switching devices in each of the first and second "and" gates being connected to the first potential transformer and to the first current transformer, respectively, and said third and fourth switching devices in each of the first and second "and" gates being connected to the second potential transformer and the second current transformer, respectively.

6. The tap changer apparatus of claim 1 wherein the logic means includes first and second bilateral AC switching means connected with the first and second potential transformers, respectively, across the first and second load transfer switches, respectively, said first and second AC switching means being connected to the first and second current transformers, respectively, said first and second AC switching means being rendered conductive, in a direction determined by the signals from their associated current transformers, when their associated load transfer switch starts to open, to energize their associated potential transformer, said energized potential transformer providing switching signals for one of the first and second solid state switching means, according to the direction of current flow therethrough.

7. The tap changer apparatus of claim 6 wherein each of the first and second AC switching means includes first and second controlled rectifiers connected in inverse parallel, the first and second current transformers each have first and second windings connected to the first and second controlled rectifiers, respectively, of its associated AC switching means, and the first and second potential transformers each have first and second windings connected to the first and second solid state switching means, respectively.

8. Tap changer apparatus comprising:
selector switch means having stationary contacts adapted for connection to taps on an electrical winding, and first and second movable contact arms for selectively engaging said stationary contacts,
reactor means having first and second windings,
first and second load transfer switches,
first and second current transformers each having primary and first and second secondary windings,
first and second potential transformers each having primary and first and second secondary windings,
an output terminal,
the first movable contact of said selector switch means, the first winding of said reactor means, said first load transfer switch, and the primary winding of said first current transformer being serially connected, respectively, to said output terminal,
the second movable contact of said selector switch means, the second winding of said reactor means, said second load transfer switch, and the primary winding of said second current transformer being serially connected, respectively, to said output terminal,
the primary windings of said first and second potential transformers being connected across said first and second load transfer switches, respectively,
first and second asymmetrically conductive, controllable solid state switching means, each having main and control electrodes, said first and second solid state switching means being connected in inverse parallel, from the junction between the first winding of said reactor means and said first load transfer switch, to the junction between the second winding of said reactor means and said second load transfer switch,
and first and second logic means connected to the control electrodes of said first and second solid state switching means,
the first secondary windings of said first and second current transformers and of said first and second potential transformers being connected to said first logic means, said first logic means applying a control signal to the control electrode of said first solid state switching means when it receives signals from both said first current transformer and said first potential transformer, and also when it receives signals from both said second current transformer and said second potential transformer,
the second secondary windings of said first and second current transformers and of said first and second potential transformers being connected to said second logic means, said second logic means applying a control signal to the control electrode of said second solid state switching means when it receives signals from both said first current transformer and said first potential transformer, and also when it receives signals from both said second current transformer and said second potential transformer.

9. The tap changer apparatus of claim 8 wherein the first solid state switching means is poled to conduct current towards the junction between the first winding of the reactor means and the first load transfer switch, and the second solid state switching means is oppositely poled, the first logic means applies a signal to the first solid state switching means when the first load transfer switch starts to open during the negative half cycle of the current flowing through the first load transfer switch, and when the second load transfer switch starts to open during the positive half cycle of the current flowing through the second load transfer switch, and the second logic means applies a signal to the second solid state switching means when the first load transfer switch starts to open during the positive half cycle of the current flowing therethrough, and when the second load transfer switch starts to open during the negative half cycle of the current flowing therethrough.

10. The tap changer apparatus of claim 8 wherein the first logic means includes first, second, third and fourth switching means responsive to the first winding of the first potential transformer, the first winding of the first current transformer, the first winding of the second potential transformer, and the first winding of the second current transformer, respectively, said first, second, third and fourth switching means being connected to render the first logic means conductive when said first and second switching means are conductive simultaneously, and also when said third and fourth switching means are conductive simultaneously, and wherein the second logic means includes first, second, third and fourth switching means responsive to the second winding of the first potential transformer, the second winding of the first current transformer, the second winding of the second potential transformer, and the second winding of the second current transformer, respectively, said first, second, third and fourth switching means being connected to render the second logic means conductive when said first and second switching means are conductive simultaneously, and also when said third and fourth switching means are conductive simultaneously.

11. The tap changer apparatus of claim 10 wherein the first and second solid state switching means and the first, second, third and fourth switching means of the first and second logic means, are silicon controlled rectifiers.

12. Tap changer apparatus comprising:
selector switch means having stationary contacts adapted for connection to taps on an electrical winding, and first and second movable contact arms for selectively engaging said stationary contacts,
reactor means having first and second windings,
first and second load transfer switches,
first and second current transformers each having primary and first and second secondary windings,
first and second potential transformers each having primary and first and second secondary windings,
an output terminal,
the first movable contact of said selector switch means, the first winding of said reactor means, said first load transfer switch, and the primary winding of said first current transformer being serially connected, respectively, to said output terminal,
the second movable contact of said selector switch means, the second winding of said reactor means, said second load transfer switch, and the primary winding of said second current transformer being serially connected, respectively, to said output terminal,
first and second bilateral AC switching means, each including first and second controlled rectifiers connected in inverse parallel,
the primary windings of said first and second potential transformers being connected across said first and second load transfer switches, respectively, through said first and second bilateral AC switching means, respectively,
first and second asymmetrically conductive, controllable solid state switching means, each having main and control electrodes, said first and second solid state switching means being connected in inverse parallel, from the junction between the first winding of said reactor means and said first load transfer switch, to the junction between the second winding of said reactor means and said second load transfer switch, the first and second secondary windings of said first and second current transformers being connected to the first and second controlled rectifiers, respectively, of said first and second bilateral AC switching means, respectively, the first and second secondary windings of said first and second potential transformers being connected to said first and second controllable solid state switching means, respectively, said first and second potential transformers applying a switching signal to one of said controllable solid state switching means when its associated bilateral AC switching means is rendered conductive by the associated current transformer, when the associated load transfer switch starts to open, to provide a circuit in parallel with the opening load transfer switch, until the first current zero.

References Cited

UNITED STATES PATENTS

| | | | |
|---|---|---|---|
| 3,381,213 | 4/1968 | Rice et al. | 323—43.5 |
| 3,437,913 | 4/1969 | Matzl | 323—43.5 |

LEE T. HIX, Primary Examiner

A. D. PELLINEN, Assistant Examiner

U.S. Cl. X.R.

317—11